(12) United States Patent
Ahn et al.

(10) Patent No.: US 12,668,541 B2
(45) Date of Patent: Jun. 30, 2026

(54) HEAT INSULATION UHPC COMPOSITION HAVING ENHANCED HEAT INSULATION PROPERTIES AND COMPRESSIVE STRENGTH

(71) Applicant: JEONGYANG SG CO., LTD., Chungcheongnam-do (KR)

(72) Inventors: Byung Kwun Ahn, Daejeon (KR); Young Jong Yoo, Gyeonggi-do (KR); Sang Hee An, Daejeon (KR); Chang Keun Song, Chungcheongnam-do (KR); Jun Bum Ahn, Chungcheongnam-do (KR); Jae Wook Baek, Daejeon (KR)

(73) Assignee: JEONGYANG SG CO., LTD., Chungcheongnam-do (KR)

( * ) Notice: Subject to any disclaimer, the term of this patent is extended or adjusted under 35 U.S.C. 154(b) by 411 days.

(21) Appl. No.: 18/561,338

(22) PCT Filed: May 26, 2022

(86) PCT No.: PCT/KR2022/007497
§ 371 (c)(1),
(2) Date: Nov. 16, 2023

(87) PCT Pub. No.: WO2022/250476
PCT Pub. Date: Dec. 1, 2022

(65) Prior Publication Data
US 2024/0246856 A1 Jul. 25, 2024

(30) Foreign Application Priority Data

May 27, 2021 (KR) ........................ 10-2021-0068478

(51) Int. Cl.
*C04B 18/14* (2006.01)
*C04B 14/06* (2006.01)
*C04B 103/32* (2006.01)

(52) U.S. Cl.
CPC ............ *C04B 18/146* (2013.01); *C04B 14/06* (2013.01); *C04B 2103/32* (2013.01); *C04B 2235/528* (2013.01)

(58) Field of Classification Search
CPC ... C04B 18/146; C04B 14/06; C04B 2103/32; C04B 2235/528; C04B 2111/28; C04B 28/04; C04B 2103/30
See application file for complete search history.

(56) References Cited

U.S. PATENT DOCUMENTS

| | | | | | |
|---|---|---|---|---|---|
| 4,482,385 | A | * | 11/1984 | Satkowski | .............. C04B 28/04 106/737 |
| 4,501,830 | A | * | 2/1985 | Miller | ..................... C04B 28/04 523/401 |

FOREIGN PATENT DOCUMENTS

| | | | | | |
|---|---|---|---|---|---|
| CN | 107827418 | A | * | 3/2018 | ............. C04B 28/04 |
| CN | 109021659 | A | * | 12/2018 | ............... C09D 5/34 |
| EP | 0273181 | A2 | * | 7/1988 | ........... F16D 69/028 |
| JP | H10-146823 | A | | 6/1998 | |
| JP | 5703184 | B2 | * | 4/2015 | ........... B29C 48/865 |
| KR | 10-2004-0057501 | A | | 7/2004 | |
| KR | 10-2011-0077395 | A | | 7/2011 | |
| KR | 20120066277 | | | 6/2012 | |
| KR | 10-2017-0104676 | A | | 9/2017 | |
| KR | 102000102 | B1 | * | 7/2019 | ........... C04B 18/141 |
| KR | 10-2034731 | B1 | | 10/2019 | |
| PT | 109198 | A | * | 8/2017 | ............. C04B 28/00 |

OTHER PUBLICATIONS

PCT International Search Report for related International Application No. PCT/KR2022/007497, dated Aug. 29, 2022, 4 pages.

* cited by examiner

*Primary Examiner* — Anthony J Green
(74) *Attorney, Agent, or Firm* — ArentFox Schiff LLP; Yun H. Choe

(57) ABSTRACT

A heat insulation UHPC composition having enhanced heat insulation properties and compressive strength is provided where silica beads are mixed into a UHPC composition so as to enable blocking radiant heat, thereby enhancing heat insulation properties and simultaneously enhancing compressive strength. One preferred embodiment of the present invention comprises, with respect to 100 parts by weight of cement; 24-26 parts by weight of silica fume; 20-60 parts by weight of fine aggregate; 30-150 parts by weight of silica beads; and 3-4 parts by weight of a superplasticizer, wherein the cement is mixed with water such that the water-cement ratio (cement weight ratio) is 28%.

5 Claims, 2 Drawing Sheets

FIG. 3

HEAT INSULATION UHPC COMPOSITION HAVING ENHANCED HEAT INSULATION PROPERTIES AND COMPRESSIVE STRENGTH

CROSS-REFERENCE TO RELATED APPLICATION

The application is a U.S. National Stage Application of PCT International Application No. PCT/KR2022/007497, filed May 26, 2022, which claims priority from the Korean Patent Application No. 10-2021-0068478 filed May 27, 2021, the disclosures of each of which are hereby incorporated by reference in their entireties.

BACKGROUND

The present disclosure relates to a heat insulation UHPC composition having enhanced heat insulation properties and compressive strength, and more specifically to a heat insulation UHPC composition having enhanced heat insulation properties and compressive strength, in which silica beads are mixed into a UHPC composition so that radiant heat is blocked, thereby enhancing both heat insulation properties and compressive strength.

Typically, in the case of buildings with balconies or cantilever structures in which the inside and outside are connected, thermal break insulation is installed at a boundary between a concrete slab and an exterior wall to prevent thermal bridges at the boundary between the exterior wall and the slab protruding from the exterior wall, thereby reducing indoor energy losses or occurrence of condensation through the slab.

Additionally, to firmly support slabs protruding from cantilever-structured buildings, such a thermal break insulation has a plurality of compression modules for strengthening compressive strength at the bottom of the thermal break insulation. Such compression modules serve to enhance the structural function of the entire insulation by using excellent ultra-high performance concrete (UHPC) having high strength.

However, in these compression modules, structural performance, such as compressive strength, is deteriorated when using materials that enhance heat insulation properties. For this reason, even when using ultra-high performance concrete (UHPC) having excellent strength, the heat insulation properties are poor. Conventionally, satisfying both heat insulation performance and structural performance was extremely difficult.

The technology behind the present disclosure includes Korean Patent No. 10-1238835, titled "Ultra-high performance and low-viscosity concrete composition using Type 1 cement" (Patent Document 1). The background technology mentioned above proposed an "Ultra-high performance and low-viscosity concrete composition using Type 1 cement, the cement mixed by setting a unit quantity of 130 to 150 kg/m$^3$, a water-binder ratio of 11 to 13 wt %, a fine aggregate fineness modulus to 2.9 to 3.1, a fine aggregate ratio to 15 to 45 wt %, and an amount of a water-reducing agent to 1.0 to 3.0 wt % with respect to the weight of the binder, in which the binder includes 55 to 60 wt % of Type 1 of ordinary Portland Cement, 15 to 25 wt % of a low-fineness silica fume having a fineness of 100,000 to 150,000 cm$^2$/g, 15 to 25 wt % of a ground granulated blast-furnace slag having a fineness of 4,000 to 10,000 cm$^2$/g, and 1 to 10 wt % of anhydrite having a fineness of 3,000-8,000 cm$^2$/g, and the concrete composition exhibits an ultra-high strength of 200

MPa or higher and a low-viscosity of 100 Pa·s or lower. As a result, concrete having an ultra-high strength of 200 MPa or higher can be provided even with the use of Type 1 cement, enabling economically feasible application of ultra-high performance concrete.

However, although the background technology described above also provides high compressive strength, there is a problem in that enhancing heat insulation properties is difficult.

SUMMARY OF THE INVENTION

The present disclosure, which has been proposed to solve the above problems, aims to provide a heat insulation UHPC composition having enhanced heat insulation properties and compressive strength, in which silica beads are mixed into the UHPC composition so that radiant heat is blocked, thereby enhancing both heat insulation properties and compressive strength and enabling the composition to be applied to a variety of fields that require both insulation performance and structural performance, including a thermal break insulation.

The present disclosure aims to provide a heat insulation UHPC composition having enhanced heat insulation properties and compressive strength, the composition including 24 to 26 parts by weight of a silica fume, 20 to 60 parts by weight of a fine aggregate, 30 to 150 parts by weight of silica beads, and 3 to 4 parts by weight of a superplasticizer, based on 100 parts by weight of cement, in which the cement is mixed with water in a water-cement ratio (cement weight ratio) of 28%.

In addition, provided is a heat insulation UHPC composition having enhanced heat insulation properties and compressive strength, in which the silica beads have a spherical form.

In addition, provided is a heat insulation UHPC composition having enhanced heat insulation properties and compressive strength, in which the silica beads have a size of 4 to 7 μm.

In addition, provided is a heat insulation UHPC composition having enhanced heat insulation properties and compressive strength, in which the fine aggregate is silica sand.

In a heat insulation UHPC composition having enhanced heat insulation properties and compressive strength of the present disclosure, silica beads are mixed with the UHPC composition so that radiant heat is blocked, thereby enhancing both heat insulation properties and compressive strength and enabling the composition to be applied to a variety of fields that require both insulation performance and structural performance, including a thermal break insulation.

BRIEF DESCRIPTION OF DRAWINGS

The following drawings attached to this specification illustrate preferred embodiments of the present disclosure and serve to further understand the technical idea of the present disclosure along with the detailed description of the present disclosure. Therefore, the present disclosure is not to be construed as being limited to the matters described in the attached drawings.

FIGS. 2 and 3 are cross-sectional views of the thermal break insulation structure of FIG. 1 above.

DETAILED DESCRIPTION OF THE INVENTION

Hereinbelow, the present disclosure will be described in detail with reference to embodiments shown in the attached drawings, but the presented embodiments are illustrative for a clear understanding of the present disclosure, and the present disclosure is not limited thereto.

Hereinafter, the technical configuration of the present disclosure will be described in detail according to preferred embodiments.

A heat insulation UHPC composition having enhanced heat insulation properties and compressive strength of the present disclosure includes 24 to 26 parts by weight of a silica fume, 20 to 60 parts by weight of a fine aggregate, and 30 to 150 parts by weight of silica beads, based on 100 parts by weight of cement, in which the cement is mixed with water in a water-cement ratio (cement weight ratio) of 28%.

Figure 1:
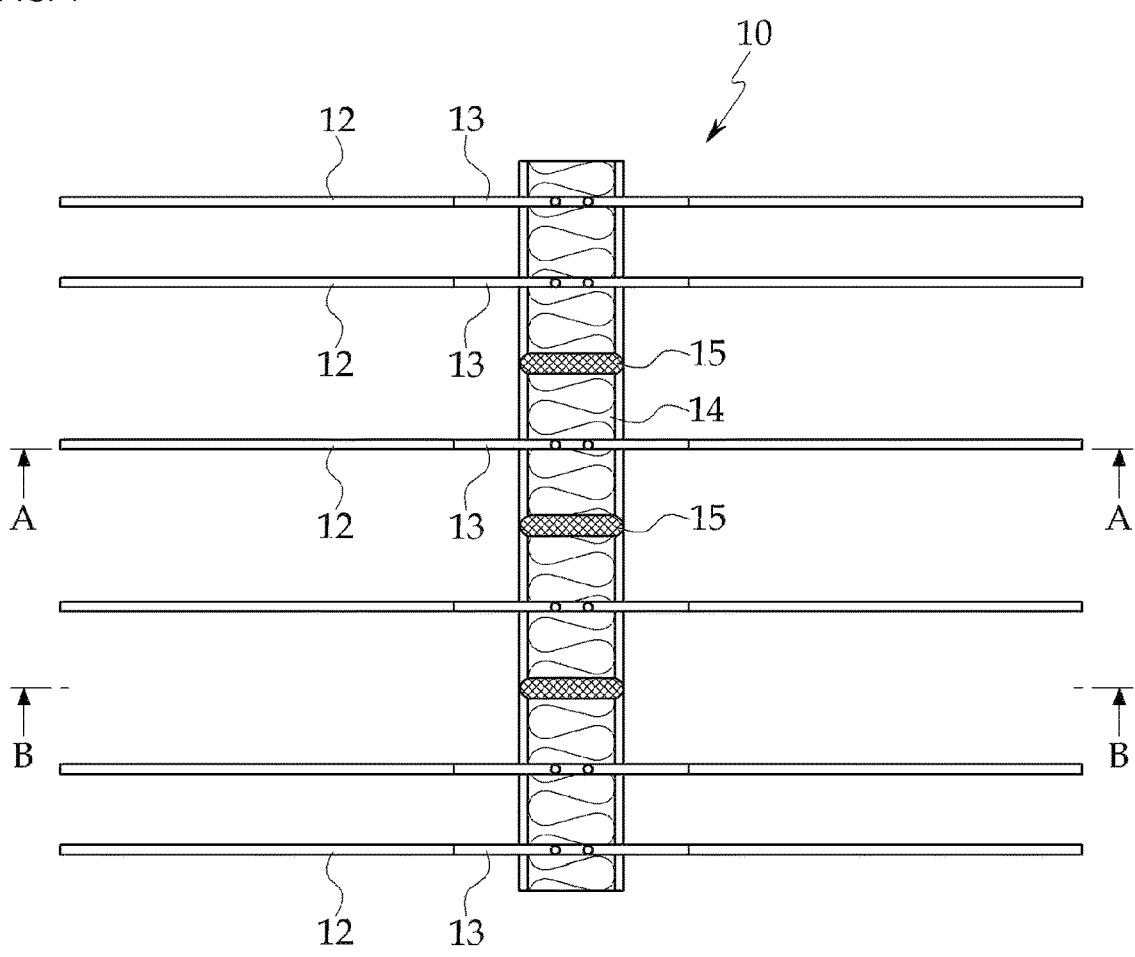
FIG. 1 is a plan view illustrating one example of a thermal break insulation structure, to which a heat insulation UHPC composition having enhanced heat insulation properties and compressive strength of the present disclosure is applied.
Figure 2:
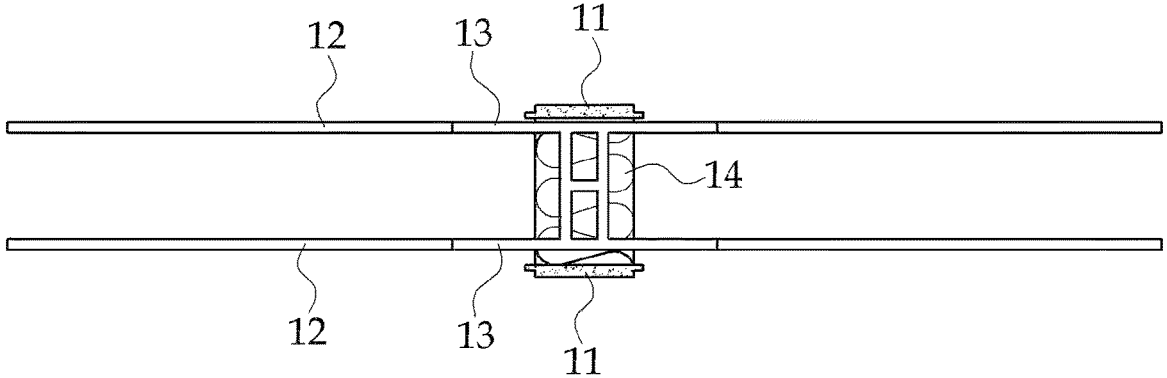
Figure 3:
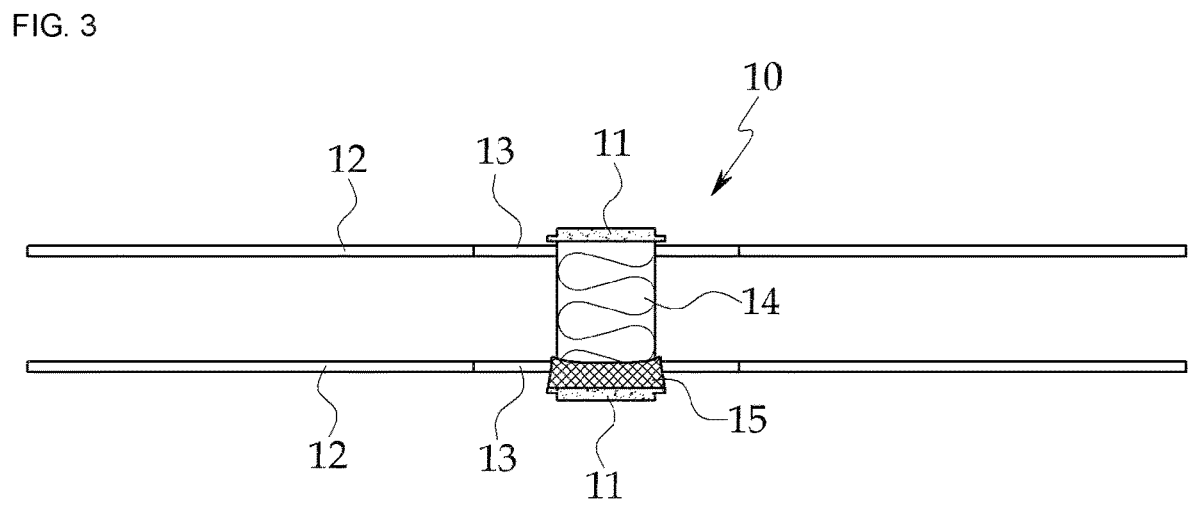

FIG. 1 is a plan view illustrating one example of a thermal break insulation structure, to which the heat insulation UHPC composition having enhanced heat insulation properties and compressive strength of the present disclosure is applied, and FIGS. 2 and 3 are cross-sectional views of FIG. 1.

As illustrated in FIGS. 1 to 3, the heat insulation UHPC composition having enhanced heat insulation properties and compressive strength of the present disclosure described above may be applied to various fields that require both insulating performance and structural performance, including a thermal break insulation.

Typically, a thermal break insulation structure 10 is composed of a heat insulation 14 having a predetermined size, fire safety elements 11, such as CRC boards, independently positioned at the top and bottom of the heat insulation 14, tensile/shear elements 13 to penetrate the heat insulation 14, tensile elements 12, such as rebars, formed while extending from the tensile/shear elements 13, and compression elements 15 formed inside the heat insulation 14.

In ultra-high performance concrete compositions, cement and silica fumes are used as binders. When mixing less than 24 parts by weight of the silica fume, the constructability is poor, and when mixing more than 26 parts by weight of the silica fume, the amount of water required to obtain fluidity increases, and thus the proportion of voids remaining after final curing increases. For this reason, the strength of the concrete is reduced, so 24 to 26 parts by weight of the silica fume is preferably mixed based on 100 parts by weight of the cement.

The heat insulation UHPC composition having enhanced heat insulation properties and compressive strength of the present disclosure includes only the fine aggregate but does not include coarse aggregates. Thus, any inexpensive and hard materials among mineral materials, which is currently available, may be used as the fine aggregate.

Such a fine aggregate does not chemically react with water but accounts for a partial volume of the concrete while contributing to strengthening the concrete.

In particular, in the present disclosure, silica sand (having a size of about 0.8 to 0.2 mm) may be used as the fine aggregate.

Based on 100 parts by weight of the cement, when mixing less than 20 parts by weight of the fine aggregate, the strength is reduced, and when mixing more than 60 parts by weight of the fine aggregate, cracks and the like are likely to combine. For this reason, 20 to 60 parts by weight of the fine aggregate is preferably mixed based on 100 parts by weight of the cement.

The silica beads are made of silica gel containing $SiO_2$ as the main ingredient and having a small spherical form.

The silica beads are dispersed to increase the packing density, thereby increasing the compressive strength. However, based on 100 parts by weight of the cement, when mixing less than 30 parts by weight of the silica beads, the thermal conductivity is difficult to be reduced, and when mixing more than 150 parts by weight of the silica beads, the strength is reduced. For this reason, 30 to 150 parts by weight of the silica beads are preferably mixed based on 100 parts by weight of the cement.

In particular, in the present disclosure, enhancement in both heat insulation properties and compressive strength must be satisfied, so the structural form and size of the silica beads added are critical.

Therefore, in the present disclosure, the silica beads may be formed into a spherical shape such that the compressive strength may be uniformly distributed. Additionally, the silica beads and the silica sand added may be dispersed to increase the packing density, thereby increasing the compressive strength.

Such silica beads in the spherical form may have a size of 1 to 10 μm, which is preferably in a range of 4 to 7 μm. When the silica beads have a size of less than 4 μm or more than 7 μm, the packing density is insufficient, resulting in a decrease in the compressive strength. For this reason, the silica beads are preferably formed to have a size of 4 to 7 μm.

Experimental Example 1

As shown in Table 1, while silica beads were not mixed in a comparative example, in all examples, silica beads were mixed in an amount range of 30 to 150 parts by weight based on 100 parts by weight of cement. Additionally, in both the comparative example and examples, 3.4 parts by weight of a superplasticizer was further mixed based on 100 parts by weight of the cement. Furthermore, a weight ratio of water to cement was fixed at 28% in both the comparative example and examples, thereby performing compressive strength and thermal conductivity tests on the compositions of the comparative example and examples.

TABLE 1

| | | | | | | | unit: wt % |
|---|---|---|---|---|---|---|---|
| Classification | W/C | C | SF | SS | SP | SB | AG |
| Comparative Example | 28.0 | 37.0 | 9.3 | 40.7 | 13.0 | — | — |
| Example 1 | 28.0 | 46.5 | 11.6 | 11.6 | — | 30.2 | — |
| Example 2 | 28.0 | 45.7 | 11.4 | 25.1 | — | 16.0 | 1.8 |
| Example 3 | 28.0 | 45.7 | 11.4 | 25.1 | — | 29.7 | 1.8 |
| Example 4 | 28.0 | 37.0 | 9.3 | — | — | 53.7 | — |

In both the comparative example and examples, 3.4 parts by weight of the superplasticizer was further added to the mixing ratios shown in Table 1, based on 100 parts by weight of the cement.

In this case, W/C stands for a water cement ratio,

C stands for cement, SF stands for silica fume, SS stands for silica sand,

SP stands for silica powder, SB stands for silica beads, and AG stands for aerogel.

The values described above represent the ratio of each mixed material added to the entire mixed material.

Based on the weight of the cement, about 1 part by weight of steel fiber may be further mixed. In this case, the fiber has a length of about 10 to 14 mm.

In both the comparative example and examples, 3.4 parts by weight of the superplasticizer was further mixed based on 100 parts by weight of the cement. Based on 100 parts by weight of the cement, 3 to 4 parts by weight of the super-plasticizer may be further mixed.

The superplasticizer is added to improve mixing properties, and various known superplasticizers may be used. When using less than 3 parts by weight of the superplasticizer, the effect of improving fluidity is insignificant. Accordingly, a large amount of mixing water is used, resulting in a decrease in compressive strength. When using more than 4 parts by weight of the superplasticizer, the effect of improving fluidity is insignificant, and material separation and the like occur. For this reason, 3 to 4 parts by weight of the superplasticizer is preferably further mixed based on 100 parts by weight of the cement.

As shown in Table 1, in the comparative example, the silica beads were not mixed, and in all examples, the silica beads were mixed in an amount range of 30 to 150 parts by weight based on 100 parts by weight of the cement. Additionally, the weight ratio of water to the cement was fixed at 28% in both the comparative example and examples.

As shown in Table 1, the compressive strength and thermal conductivity of each composition of the comparative example and examples were measured. Table 2 shows the results thereof.

TABLE 2

| Classification | Compressive strength (MPa) | Thermal conductivity (W/mK) |
| --- | --- | --- |
| Comparative Example | 186.0 | 1.39 |
| Example 1 | 187.29 | 0.89 |
| Example 2 | 107.39 | 0.79 |
| Example 3 | 110.59 | 0.64 |
| Example 4 | 208.96 | 0.77 |

As in Table 2, in the case of the comparative example in which the silica beads were not mixed, the measured compressive strength was 186.0 MPa, and the measured thermal conductivity was 1.39. Thus, it is seen that all examples in which the silica beads are mixed show lower thermal conductivity than the comparative example.

In addition, Examples 2 and 3 exhibited a slightly lower compressive strength than the comparative example. However, unlike in Examples 2 and 3, Example 1, in which the mixing ratio of silica sand was reduced, exhibited compressive strength almost the same as that of the comparative example. Furthermore, Example 4, in which the mixing ratio of silica beads was increased, excluding silica sand, exhibited a compressive strength of 208.96 MPa, which appeared to be significantly higher than that of the comparative example.

Therefore, it is seen that both the heat insulation performance and structural performance, including a thermal break insulation, are enabled to be satisfied by mixing the silica beads so that radiant heat is blocked, thereby enhancing both the heat insulation properties and compressive strength.

In the heat insulation UHPC composition having enhanced heat insulation properties and compressive strength of the present disclosure as described above, the silica beads are mixed with the UHPC composition so that radiant heat is blocked, thereby enhancing both the heat insulation properties and compressive strength and enabling the composition to be applied to a variety of fields that require both insulation performance and structural performance, including a thermal break insulation.

Although the present disclosure has been described in detail with reference to the illustrated embodiments, those skilled in the art will appreciate that various modifications, additions, and substitutions are possible with reference to the presented embodiments, without departing from the scope and spirit of the present disclosure. The present disclosure is not limited by such modifications, additions, and substitutions but is limited by the appended claims.

A heat insulation UHPC composition having enhanced heat insulation properties and compressive strength of the present disclosure is a significantly useful invention that can be applied to a variety of fields that require both heat insulation performance and structural performance, including a thermal break insulation, by mixing silica beads with the UHPC composition so that radiant heat is blocked, thereby enhancing both heat insulation properties and compressive strength.

(National R&D Project that Supported the Present Disclosure)

Project Unique Number: 1615012261

Project Serial Number: 155780

Government Department: Ministry of Land, Infrastructure and Transport

Specialized Institution for Project Management: Korea Agency for Infrastructure Technology Advancement Title of Research Business: Land, Infrastructure, and Transport Technology Commercialization Support (R&D)

Title of Project: Development of commercialization technology for zero-energy building insulation structures capable of reducing heat flow in thermal bridge areas of reinforced concrete buildings by 40% or more Contribution Rate: 1/1

Supervising Institute: JeongYang SG Co., Ltd

Research Period: Jan. 1, 2021 to Dec. 31, 2021

The invention claimed is:

1. A heat insulation UHPC composition having enhanced heat insulation properties and compressive strength, the composition comprising:

cement;

24 to 26 parts by weight of a silica fume, based on 100 parts by weight of cement;

20 to 60 parts by weight of a fine aggregate, based on 100 parts by weight of cement;

30 to 150 parts by weight of silica beads, based on 100 parts by weight of cement; and 3 to 4 parts by weight of a superplasticizer, based on 100 parts by weight of cement, wherein the cement is mixed with water in a weight ratio of water to cement of 28%.

2. The heat insulation UHPC composition of claim 1, wherein the silica beads have a spherical form.

3. The heat insulation UHPC composition of claim 2, wherein the silica beads have a size of 4 to 7 μm.

4. The heat insulation UHPC composition of claim 1, wherein the fine aggregate is silica sand.

5. A thermal break insulation structure comprising the heat insulation UHPC composition of claim 1.

* * * * *